Figure 1:
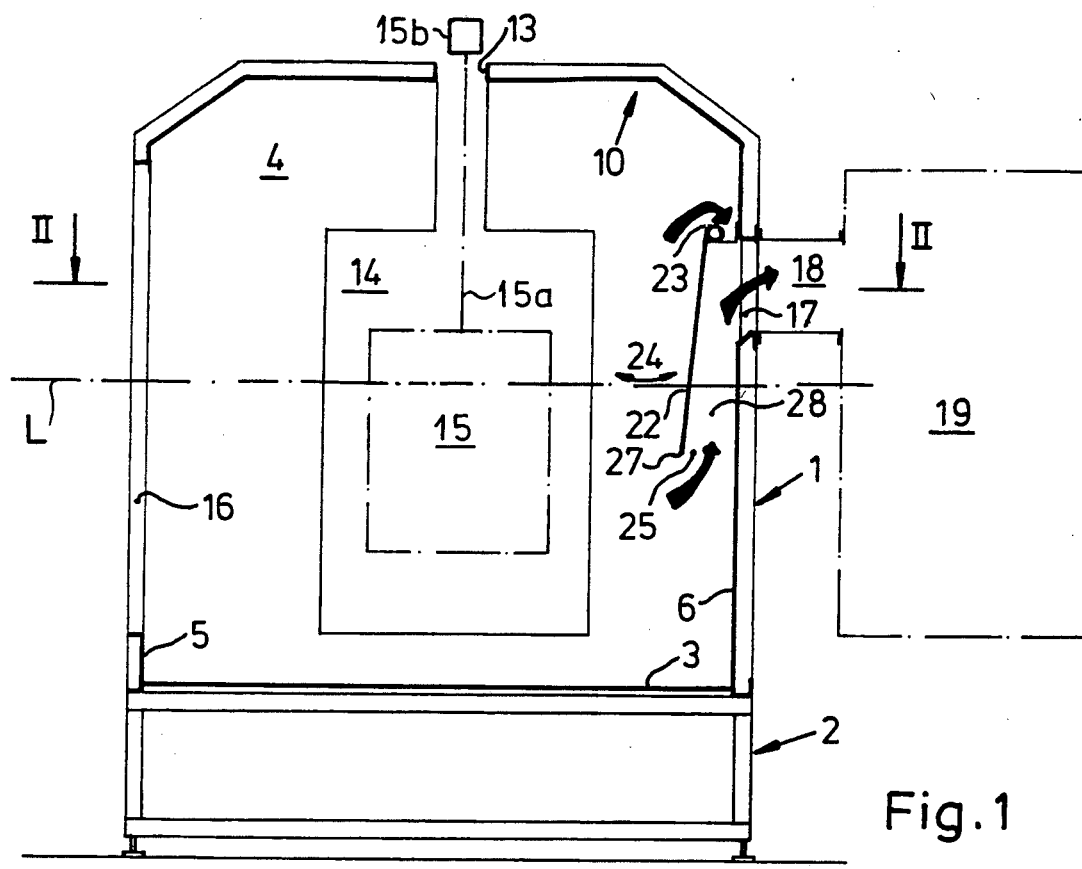

United States Patent [19]

Vöhringer

[11] Patent Number: 5,056,460
[45] Date of Patent: Oct. 15, 1991

[54] POWDER-SPRAY CABIN HAVING A BAFFLE FOR RAW GAS IN THE SUCTION OUTFLOW

[75] Inventor: Gerhard F. Vöhringer, Markdorf, Fed. Rep. of Germany

[73] Assignee: Esb Elektrostatische Spruh-Und Beschichtungsanlagen G.F. Vohringer GmbH, Meersburg, Fed. Rep. of Germany

[21] Appl. No.: 483,209

[22] Filed: Feb. 20, 1990

[30] Foreign Application Priority Data

Feb. 18, 1989 [DE] Fed. Rep. of Germany ....... 3905057

[51] Int. Cl.$^5$ .................. B05B 15/12; B05C 19/06
[52] U.S. Cl. .................. 118/634; 118/309; 118/326; 118/DIG. 7; 55/DIG. 46
[58] Field of Search ......... 118/309, 326, 634, DIG. 7; 55/302, DIG. 46; 98/115.2

[56] References Cited

U.S. PATENT DOCUMENTS 4,303,417  12/1981  Koch, II ........................ 118/326

FOREIGN PATENT DOCUMENTS 1315671  5/1973  United Kingdom .

Primary Examiner—Richard V. Fisher
Assistant Examiner—Charles K. Friedman
Attorney, Agent, or Firm—Herbert Dubno

[57] ABSTRACT

A spray cabin for powder spray having a spray opening on one side and an outlet opening on an opposite side connected to a powder separator applying suction to the outlet opening has at least a baffle directing the outflow upwardly along the wall provided with the outlet opening to entrain particles which have deposited on the floor upwardly and provide a quiescent or calming chamber immediately upstream of the outlet opening.

12 Claims, 5 Drawing Sheets

POWDER-SPRAY CABIN HAVING A BAFFLE FOR RAW GAS IN THE SUCTION OUTFLOW

FIELD OF THE INVENTION

My present invention relates to a powder-spray cabin and, more particularly, to a powder-spray cabin having a baffle in the path of the gas and excess particles entrained by the gas, i.e. in the suction outflow path of the powder-spray cabin.

BACKGROUND OF THE INVENTION

Powder-spray cabins are widely used for protecting the environment during the intense spraying of objects with powders, generally synthetic resin powders, serving to coat, color or treat an article, where the powder is entrained in a gas stream.

In general, the powder-spray cabin may have top and bottom walls and, extending around the spray chamber, peripheral walls which can include a pair of mutually parallel side walls and a pair of mutually parallel end walls.

Means can be provided for supporting the article in the chamber, e.g. for suspending the article therein, so that the article is contacted by the powder which can be sprayed from spray guns or nozzles through an inlet or spraying opening along the peripheral wall, e.g. in one of the side walls.

A suction path is formed from the chamber to an outlet opening, generally in an opposite side wall of the spray cabin which can lead to a suction source, e.g. a blower, and to a system for separating the excess particles from the entraining gas so that, for example, the particles may be reused.

It may be noted that the articles to be sprayed can be introduced through an opening or door in one end wall, can be suspended on a track extending through the enclosure and can be removed, as a coated article through an opening or door in the opposite end wall. The articles can be stationary within the enclosure during the spraying process or can continuously move therethrough.

Means can be provided to impart an electrostatic charge to the particles which causes them to adhere to the article which generally is at an opposite electrostatic charge.

In general, one seeks to maintain the spray-powder flow through the enclosure in approximately parallel streams which are laminar and to avoid turbulence and the forms of eddy currents within the enclosure. This not only is desirable for uniform coating of the workpieces since a laminar flow is most conducive to such uniform coating, but also reduces the tendency of the particles to settle out of the entraining gas. For this reason, attempts have been made to ensure that by and large all paths through the enclosure avoid turbulence sources and thus minimize changes of direction and speed of the gas to maintain the uniformity of flow.

It is possible to ensure that relatively smooth and uniform flow of gas through the enclosure and to minimize directional change and speed change when the powder collector or suction outlet is located in a flow direction directly behind the spray chamber. However, Where there is not a direct or straight path between the spray chamber and the suction duct or powder collector or for other reasons it is not possible to ensure a straight line flow of the gases containing the powder through the chamber, it can scarcely be avoided that a substantial quantity of the spray powder will deposit on the floor or bottom wall of the chamber and will not therefore, be deposited on the articles to be coated Deposited powder, of course, must be removed from the floor or bottom of the powder-spray chamber.

Significant problems arise when the raw gas is diverted from the predetermined straight line path through the cabin. This applies mainly to powder-spray cabins in which gas is drawn out horizontally and thus to double cabins. Indeed, when the outlet opening is high on a cabin wall, in edge regions deflection of the gas stream can cause flow turbulence which causes the powder in part to escape from the cabin and in part to deposit upon the bottom wall of the spray cabin.

Such deposition can reduce recirculating powder flow and may result in the introduction of impurities into the spray powder, partial mixture of the spray powder with powders of other characteristics and a coloration of the powder or a change in the color tone of the powder from the desired color tone.

A powder spray cabin of the above-described type is disclosed in British patent 1,315,671. In this case, between the side walls, a tray-shaped bottom is provided in addition to a vertical rear wall formed by a common flat baffle. The baffle begins at the lower edge of a spray inlet opening, rises and from above is deflected into a displaceable carriage provided with a filter arrangement whereby the powder is separated from the gas.

At the cabin side, the front wall of this baffle has a rectangular opening ahead of which, extending on all sides beyond this opening, is a shield or curtain which in the wall plane has a suction slit in an annular pattern surrounding the opening and through which raw gas is directly drawn by suction from the cabin into the duct.

The suction intake cross section under the underside of the window is greater than the slit cross section between the shield and the inner cabin wall. The raw gas which is drawn therethrough has a correspondingly larger flow rate.

OBJECTS OF THE INVENTION

It is the principal object of the invention to provide, by comparison with this earlier device, an improved apparatus for recovering surplus spray material.

Another object of the invention is to provide a spray cabin in which the aforedescribed disadvantages are avoided and excess powder particles can be withdrawn from the enclosure more efficiently than has hitherto been the case.

Still another object of the invention is to provide an apparatus for the purposes described in which the settling of powder from the entraining gas will be minimized within the enclosure, to the extent that it does not deposit on the articles to be coated, and so that, unlike the earlier system described, particles which are deposited are readily reentrained by the gas stream and thus the walls of the chamber are maintained clean and free from particles.

Still another object of the invention is to provide a system whereby the raw gas laden with surplus powder particles, i.e. powder which has not been deposited on the articles to be coated, so that the smallest possible quantity of powder is deposited on the cabin floor or on the cabin or duct walls, the larger powder proportion is directly fed to the collector or separator without contact with foreign surfaces or materials, and contamination of the powder is minimized.

SUMMARY OF THE INVENTION

These objects and others which will become apparent hereinafter are attained, in accordance with the invention in a powder spray booth which comprises:

means forming an enclosure having top, bottom and peripheral walls defining a spraying chamber surrounded by the peripheral walls and formed with means for introducing an article to be sprayed with powder into the chamber, for supporting the article for spraying in the chamber and for removal of a powder-coated article from the chamber;

means in the peripheral walls forming a spraying opening communicating with the chamber, traversed by a gas flow and enabling the spraying of an article supported in the chamber with powder entrained in the gas flow through the spraying opening;

means in the peripheral walls, spaced from the spraying opening, forming an outlet opening for discharge of the gas;

collecting means connected with the outlet opening and applying suction thereto for collecting excess powder particles from the gas traversing the outlet opening;

a shield member spaced from the peripheral wall formed with the outlet opening and disposed in the chamber to overlie the outlet opening and extend beyond the perimeter thereof at least downwardly so as to deflect powder-entraining gas around the shield member into the outlet opening from the chamber, the shield member defining a plurality of suction passages around a periphery of the shield member and generally radial with respect to a center of the outlet opening between the chamber and the outlet opening, the suction passages including at least one upwardly extending suction passage with a flow cross section which increases in a direction of the bottom wall; and means for adjusting a flow cross section of at least one of the suction passages.

I have found, quite surprisingly, that the apparatus of the invention by comparison with conventional systems which attempt to maintain laminar flow of the powder-laden raw gas in the cabin, along the article to be coated and to the outlet opening, the provisions of the shield or baffle at the inlet region of the outlet opening is a vast simplification since it transforms the flow into a laminar flow in a highly uniform manner, even where that flow might not have been laminar because of the location of the outlet opening, so that only very small quantities of the powder deposit on the floor and the raw gas flow with a relatively high powder proportion can pass into the collector or separator suction flow directly.

Since a turbulencing of the flowing raw gas as a result of different deflections, primarily at the workpiece, cannot be completely avoided, the transition of the flow into the suction stream is of special importance and I have found that it is possible to practically completely avoid deposition of the particles on the floor of the enclosure and on the walls thereof by creating a calming or quiescent zone before these streams reach the suction intake which corresponds to the outlet opening.

A certain degree of calming is also achieved in the system of British patent 1,314,671 in that the flow path is comparatively long and by and large uniform. However, this type of construction requires sufficient space for the requisite path length and thus very large enclosures. Such large enclosures are not always possible or practical.

The provision of a shield which is displaced ahead of the outlet opening and proximal to the wall in which the outlet opening is formed, allows the formation of a plurality of suction passages or pathways extending radially to the outlet opening and effectively forming suction openings for the raw gas. By having the opening area increase downwardly and open toward the bottom of the enclosure or cabin, and at least one of the suction openings or pathways adjustable, I am able to create between the shield and the wall in which the shield opening is provided a quiescent or quieting passage extending radially of the outlet opening.

Effectively, therefore, the flow into the outlet opening is radially spread out upstream thereof with the individual flow paths being relatively uniform and comparatively free from the stresses which may cause turbulence. All of the flow paths radially of the outlet opening, therefore, may be highly loaded with the excess powder and there is little tendency for the entrained powder to drop out of the gas flow.

As a result, there is practically no turbulence in the discharge flow, especially since the adjustable shield or baffle allows variation of the individual cross sections and the selection of the rheological conditions, e.g. the flow speeds for the various flow paths to minimize turbulence.

I have found that highly uniform flow distribution can be obtained in a relatively simple way by having the baffle or shield inclined downwardly from the upper edge of the outlet opening toward the enclosure bottom in a sense providing a flow cross section increase toward the bottom of the flow path of the gases admitted to the outlet opening beneath or behind this shield or baffle.

Advantageously, the shield or baffle can have its upper edge swingably mounted in a hinge assembly on the wall of the enclosure provided with the outlet opening so that its inclination is adjustable. The smaller the inclination of the shield to the vertical, the greater is the component of upward flow from the bottom of the enclosure.

According to a feature of the invention, the suction opening can be provided directly adjacent a suction slit formed on the peripheral wall of the enclosure and thereby ensuring that the inner surface of this peripheral wall will be thoroughly sparged of powder by the gas flow and that any powder particles which deposit on this wall can be reentrained by the gas stream. Stated otherwise, the shield can form part of a structure which defines suction inlets, some of which may open toward the chamber directly, while others open along the all in which the outlet opening is formed so that the radial flow of gases, entering through the suction openings, can in part flush the wall provided with the outlet opening while passing radially and with a minimum of turbulence to the outlet opening in the manner described.

The widths and lengths of the individual suction openings can be different from one another. The individual form and dimensions of these suction openings are, of course, determined by the flow conditions in the particular enclosure to achieve the requisite flow distribution and calming effect.

The widths and lengths of the suction openings can, as required, differ. At least with elongated enclosures, the spraying or inlet opening in one side wall and the outlet opening communicating with the suction source collector in the opposite side wall can be horizontally offset from one another. Preferably, the outlet opening is disposed above a level corresponding to half the height of the spray chamber. This is usually the case for the preferred arrangement utilizing cyclone cabins in which the outlet opening must be located comparatively high in the wall of the enclosure.

Adjustment of the opening cross section can be made comparatively simply by defining the component with bent out sheet metal wall portions which can be bent to a greater or lesser extent to vary the flow cross section. This allows adjustment of the suction flow to the pressure and flow conditions in the particular enclosure. In this fashion I am able to significantly reduce the tendency toward the formation of turbulence in the individual flow paths in the horizontal and vertical directions.

The flow can be modified in addition within the spray chamber in various ways so that, if there is a deposition of particles from the gas stream, the greater part of the particles will deposit below the outlet opening. In this case, the shield or baffle can be formed in part as a suction shaft which extends from the outlet opening downwardly to a location below the aforementioned level and preferably to a location directly adjacent the floor or bottom wall of the chamber. The shaft can have, at its lower end, at least one downwardly open suction opening so that even with high powder densities, a sufficient velocity of flow is provided at this region to entrain all of the particles effectively upwardly through the shaft and into the outlet opening.

When the suction shaft has its lower inlet opening adjacent the floor or bottom wall of the enclosure and defining a narrow suction slit at the intake end of the shaft, it has been found to be advantageous to have this intake widen into a suction shoe which ensures an increased flow velocity at the bottom end of the suction shaft and thus a high suction force capable of extracting and lifting even large powder quantities.

In addition or alternatively, the suction openings can be distributed along the suction shaft. The suction openings can be suction slits which can have a wedge-shaped or converging configuration and can be defined by bent out wall portions of the sheet metal of the suction shaft which allow flow of gas into suction shaft for substantially the entire height of the coating chamber without sharp deflections in flow paths. The suction openings in the region at which the shaft is connected to the wall provided with the outlet opening can be formed in the connection region with the advantage described above, namely, that of flushing this wall with the outgoing gas.

BRIEF DESCRIPTION OF THE DRAWING

The above and other objects, features and advantages of the present invention will become more readily apparent from the following description, reference being made to the accompanying drawing in which:

FIG. 1 is a diagrammatic cross sectional view through a powder-coating cabin according to the invention as taken generally along the line I—I of FIG. 2;

FIG. 2 is a horizontal section taken generally along the line II—II of FIG. 1;

FIG. 3 is a view generally similar to FIG. 1 illustrating another embodiment and in which the section of the suction shaft corresponds to a section along the line III—III of FIG. 4;

FIG. 4 is a section through the outlet opening and shaft of FIG. 3, taken along the line IV—IV thereof;

FIG. 5 is another view similar to FIG. 1 of a further embodiment of the invention in which the shaft section is taken along the line V—V of FIG. 6;

FIG. 6 is a diagrammatic section along the line VI—VI of FIG. 5;

FIG. 7 is a vertical section similar to FIG. 1 illustrating another embodiment of corresponding generally to a section along the VII—VII of FIG. 8;

FIG. 8 is a section along the line VIII—VIII of FIG. 7;

FIG. 9 is an elevational view of the baffle or shield plate of FIG. 1, illustrating the side wall in which the outlet opening thereof is provided;

FIG. 10 is an elevational view of the shaft of FIG. 3, showing the wall against which that shaft is mounted; and FIG. 11 is a detail section through one of the suction openings and this shaft against the enclosure wall to which the shaft is connected, illustrating how air is drawn along that wall into the suction opening.

SPECIFIC DESCRIPTION

In the drawing, I have shown a powder-spray cabin 1 which comprises a base or support 2 on which the enclosure bottom wall 3 is mounted and which has two side walls 5 and 6 and end walls 7 and 8. The side walls and end walls are collectively referred to as the peripheral wall herein, together with the bottom wall 3 and a top wall or roof 10, define the enclosure.

A longitudinal slit 13 in the cabin roof permits hangers **15*a* to be supported by a rail 15*b* and to carry the articles 15 to be continuously displaced through the enclosure for powder coating. The articles are here shown, for example, to be plates. The conveyor system 15*a* and 15*b*** can be a conventional design.

An opening 14 in each of the end walls 7, 8 permits the articles to be continuously displaced through the enclosure.

A spray opening 16 is provided in the side wall 5 while side wall 6 has an outlet opening 17. These openings 16 and 17 are directly opposite one another (FIG. 2) or, especially in the case of elongated enclosures as in FIG. 8, may be horizontally offset from one another. In addition, more than one such spray opening can be provided and the spray openings can also be provided in the end walls or offset from the end walls to different degrees.

Generally a single outlet opening is provided, however, and will lie in a transverse median plane of the enclosure. The spray openings, however, where more than one in number, can be offset relative to the outlet opening 17 toward one or the other end wall as required.

For the spraying operation, manually or automatically operated spray devices (not shown) usually in the form of powder spray guns or other spray devices can introduce the powder into the enclosure air or in entrainment with another gas into the gas traversing the enclosure. It is common, in addition, to promote the deposition of the powder on the workpiece or article by, for example, applying different electrostatic charges to the workpiece and powder. The electrostatic charging means has not been illustrated.

From the outlet opening 17 a duct 18 extends to powder separator 19 which can generate the suction required to draw the gas through the enclosure. This apparatus is usually a filter apparatus but it can also be a cyclone separator or some other kind of particle collecting and separating device which can separate the particles from the gas. This union can be built onto the cabin or be independent thereof and connectable thereto.

What is important, of course, is that the collector 19 be capable of generating a subatmospheric pressure at the outlet opening 17 so that the suction flow of air into this outlet opening will occur. As a result there is an air or gas flow through the other cabin opening into spray chamber 4, around the article and to the outlet. This flow, according to the principles of the invention, should be as uniform and turbulent free as possible.

A special outlet duct 18, is, however, not required as long as these conditions are maintained.

The main flow enters through the spray opening 16 where the flow velocity is amplified by the velocity of the carrier medium which entrains the powder from one or more powder spray guns.

A particularly laminar flow cannot be obtained from the spray guns with their concentrated air streams over the entire path from the spray opening 16 to the outlet opening 17. As a consequence, the approach is to have the flow in the region of the workpiece at least approximately laminar with generally horizontal flow lines. By gravity, there is a change in the vertical direction of the flow line so that at the side wall 6 and in the region of this side wall on the floor of the enclosure, particles tend to deposit and accumulate and thus must be reentrained for reuse.

In the spray chamber 4 various forms of turbulence can arise. For example, as the flow impinges upon the workpiece, depending upon its shape and size and the nature of the powder feed, an initial turbulence may form.

Further turbulence can occur on the way to the outlet opening since the flow to this opening may have to rise above the median horizontal plane of the enclosure. The median horizontal plane is illustrated in FIG. 1 at L.

Of course, the smaller the outlet opening by comparison with the inlet or spray opening 16 and the greater its offset from a location directly opposite the spray opening 16, the greater must the flow toward the side wall 6 be deflected upwardly or along this wall and the more sharply must the deflection at the outlet opening 16 be. This can account for further sources of turbulence.

Figure 8:
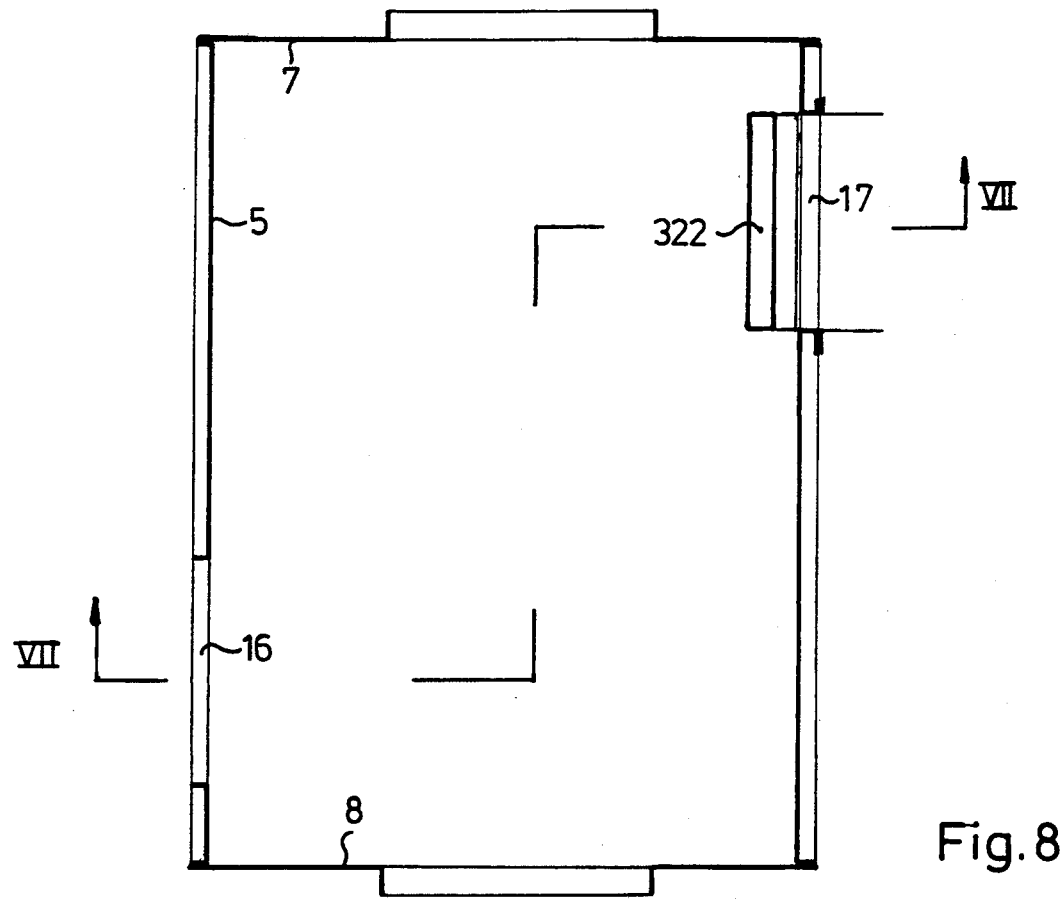

The lateral offset of the spray opening 16 and the outlet opening 17 as represented in FIG. 8, for example, contributes additional sources of turbulence.

The proportion of powder which will deposit on the floor of the enclosure 3, relative to the total powder quantity introduced into the enclosure, is directly dependent on the degree of turbulence in the powder flow through the enclosue. As a consequence, the amount of powder which precipitates from the air stream is greatest at the spray opening.

Figure 2:
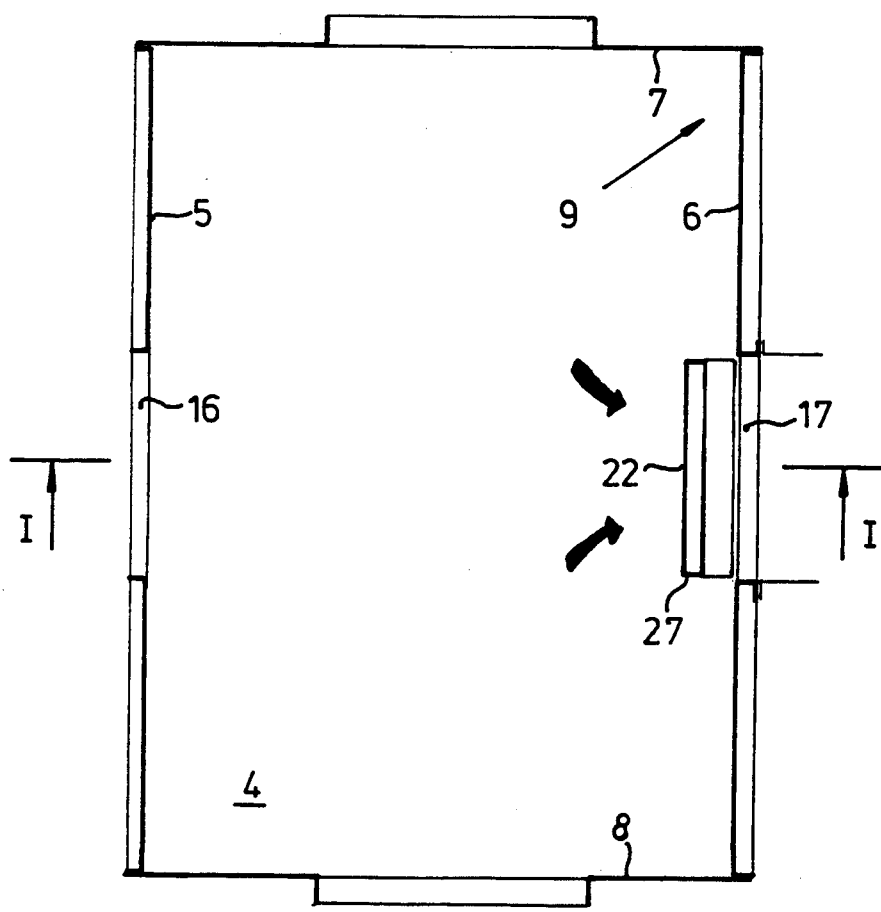
Figure 9:
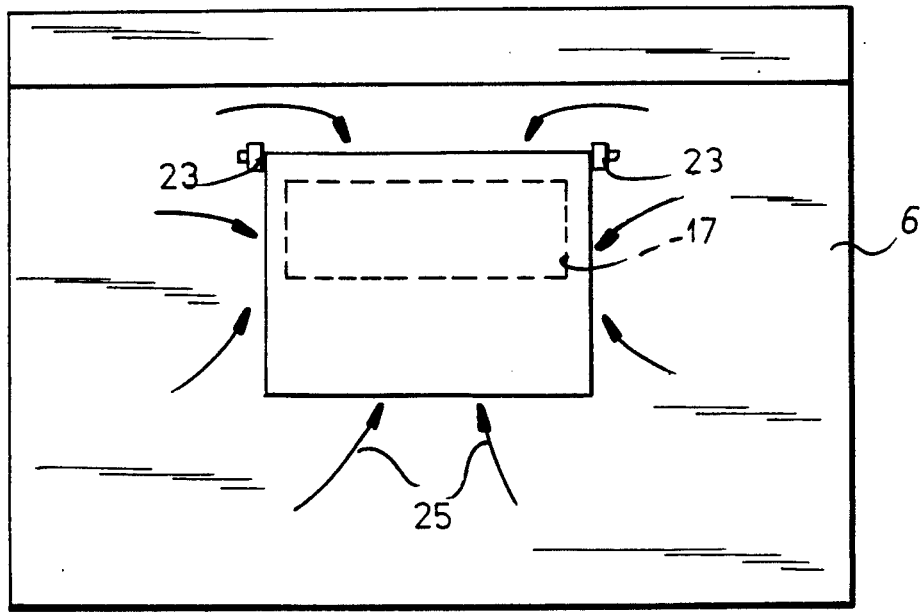
Figure 10:
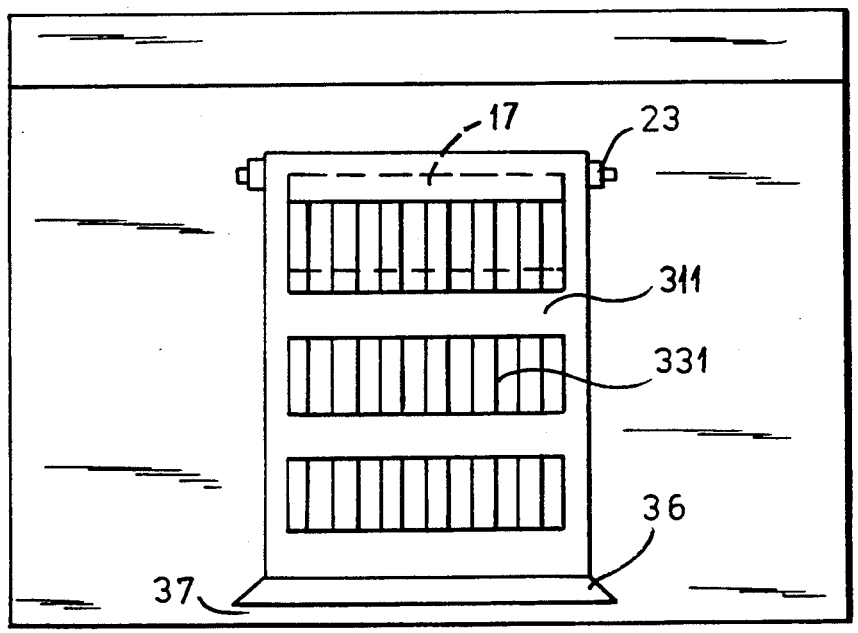
Figure 11:
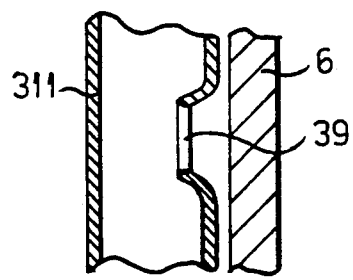

In order to reduce the overall turbulence and/or to minimize the quantity of deposited powder which can remain upon the sources of the enclosure and thus mobilize such powder for reuse within the enclosure 4 at a spacing from the side wall 6, of the peripheral wall 9, I provide the shield or baffle member 22 which, in the embodiment of FIGS. 1, 2 and 9 has the configuration of a rectangular plate at the upper edge of which a hinge 23 is provided to connect this plate to the wall 6.

The plate can be angularly displaceable as represented by the double-headed arrow 24 and locked by any conventional retention mechanism in a predetermined inclination of the vertical. The shield or baffl member 22 has its lower edge 27 disposed further in wardly of the enclosure so that the baffle has a down ward and inward inclination to form an inlet gap at it lower edge which is wider than the gaps formed by th remainder of the edges of the baffle.

As a consequence, the largest air quantity flow through this gap and hence upwardly from the region o the cabin bottom to entrain the larger part of the depos ited particles upwardly.

Because of the swingable adjustment afforded by th hinge 23, the suction openings formed between th edges of the plate and the wall 6 can be varied to th circumstances in the spray enclosure.

Independently of this adjustability, the raw gas en teraining the excess particles and drawn by the suctior in the collector 19 through the opening 17 can pass from practically all sides of the baffle plate 22 into a calming chamber 28 upstream of the outlet opening 17. In thi: calming chamber, there is an equalization of the variou: individual flows to reduce or minimize turbulence anc generate a practically laminar flow which is not af fected adversely by the suction generated by the collec tor.

Figure 3:
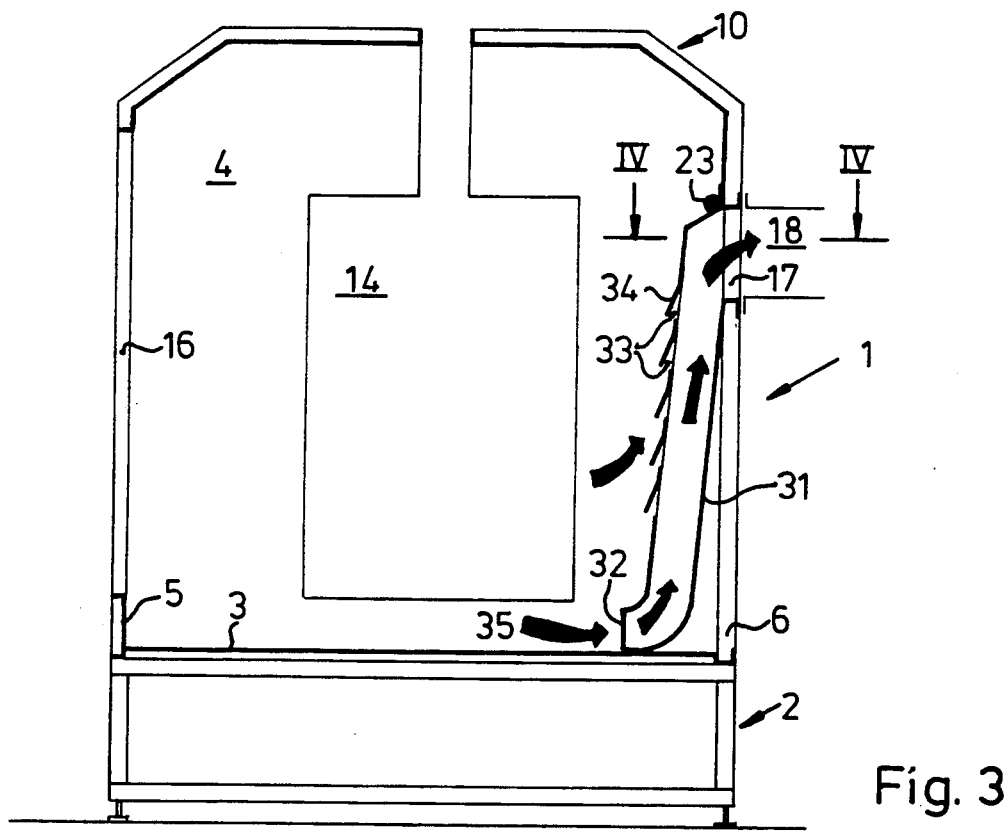
Figure 4:
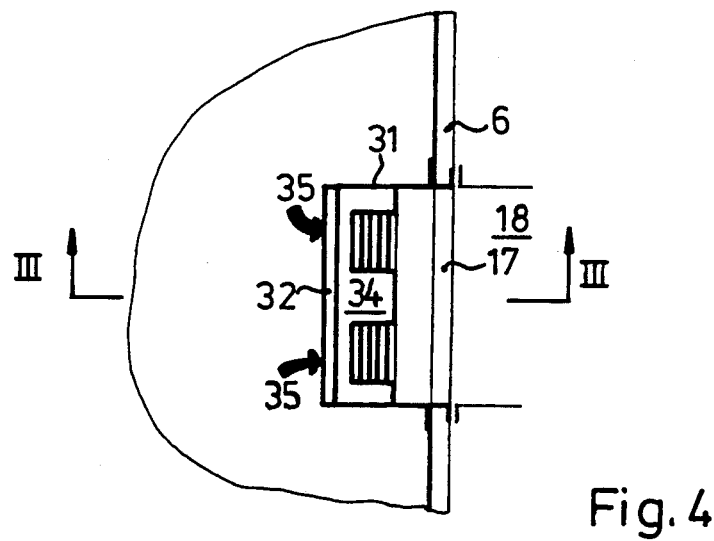
Figure 5:
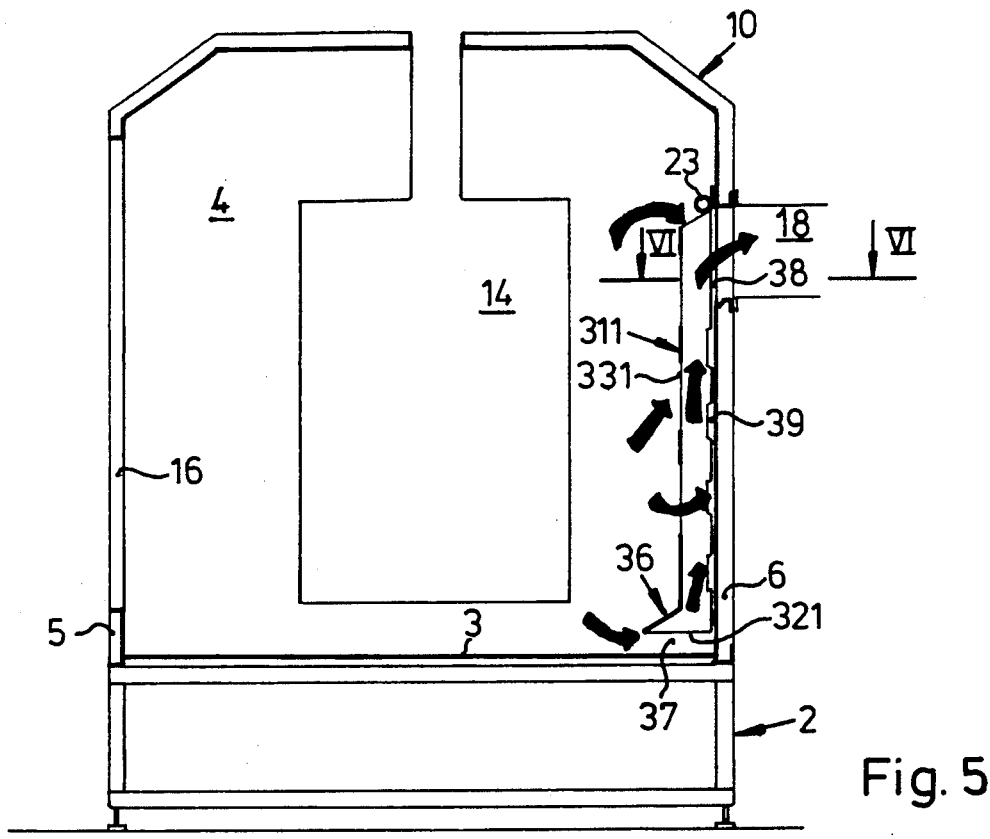
Figure 6:
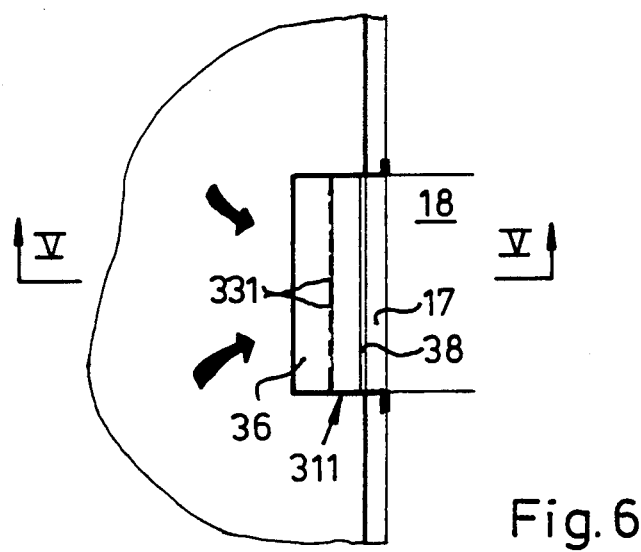

In the embodiment of FIGS. 3 and 4, the baffle is formed by a downwardly and angularly inclined suc tion shaft which has a curved intake end 32 lying upon an opening at the cabin bottom 3, and running upwardly to the outlet opening 17.

On a side turned toward the chamber, and hence at least along one side of this shaft, a row of superimposed suction openings 33 are provided in the form of wedge shaped bent guide flaps 34 which can be stamped out of the sheet metal forming the shaft.

The arrows 35 show the main upward flow from the bottom and the flows through the suction openings 33 provided by the flaps 34.

In the embodiment of FIGS. 5, 6, 10 and 11, the suction shaft is provided tightly against the side wall 6 and thus is approximately horizontal. However, here as in the case with the embodiment of FIGS. 3 and 4, a pivot or hinge joint 23 can allow swingable adjustment of the baffle.

At the lower end the suction shaft terminates in a downwardly widening suction shoe whose cross section increases toward the enclsoure bottom 3 and is separated form the latter by a suction slit 37 defined between the suction end 321 of the shaft and the enclosure bottom wall 3.

In the front wall of this shaft, suction openings 331 are provided and toward the rear wall 37 a vertical slit 38 with widening gaps 39 can be formed. This allows the intake of raw air from along the surface of the wall 6 and thus the entrainment of raw gas from around the peripheral walls to clean the latter from deposits where required. In some cases, the lateral suction openings can be omitted.

Figure 7:
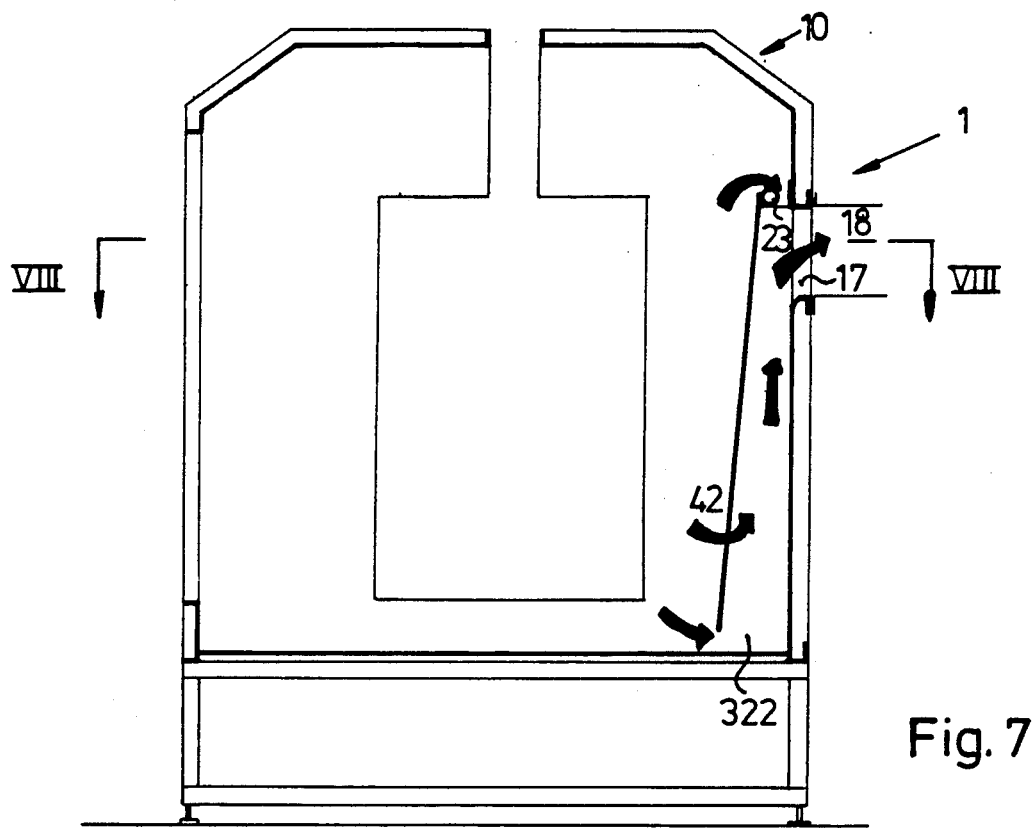

FIGS. 7 and 8 show an embodiment of the invention in which a baffle plate extends substantially to the floor 3, terminating just above the latter to define a suction opening 322 adjacent the flow in addition to the front side opening represented by the arrow 42. In FIGS. 8 the spray opening 16 and the suction shaft 322 are practically diagonally opposite one another.

I claim:

1. A powder-spray cabin comprising:
   means forming an enclosure having top, bottom and peripheral walls defining a spraying chamber surrounded by said peripheral walls and formed with means for introducing an article to be sprayed with powder into said chamber, for supporting said article for spraying in said chamber and for removal of a powder-coated article from said chamber;

means in said peripheral walls forming a spraying opening communicating with said chamber, traversed by a gas flow and enabling the spraying of an article supported in said chamber with powder entrained in said gas flow through said spraying opening;

means in said peripheral walls, spaced from said spraying opening, forming an outlet opening for discharge of said gas;

collecting means connected with said outlet opening and applying suction thereto for collecting excess powder particles from the gas traversing said outlet opening;

a shield member spaced from the peripheral wall formed with said outlet opening and disposed in said chamber to overlie said outlet opening and extend beyond the perimeter thereof at least downwardly so as to deflect powder-entraining gas around said shield member into said outlet opening from said chamber, said shield member defining a plurality of suction passages around a periphery of said shield member and generally radial with respect to a center of said outlet opening between said chamber and said outlet opening, said suction passages including at least one upwardly extending suction passage with a flow cross section which increases in a direction of said bottom wall; and means for adjusting a flow cross section of at least one of said suction passages.

2. The powder-spray cabin defined in claim 1 wherein said shield member includes a plate inclined downwardly and outwardly from said peripheral wall formed with said outlet opening and defining by its inclination the upwardly extending suction passage with said flow cross section which increases in a direction of said bottom wall.

3. The powder-spray cabin defined in claim 1 wherein said means for adjusting a flow cross section of at least one of said suction passages includes a hinge swingably suspending said shield member at an upper edge thereon on said enclosure and enabling adjustment of an inclination of said shield member.

4. The powder-spray cabin defined in claim 1 wherein said suction passages are formed as suction slits close to and communicating with said outlet opening.

5. The powder-spray cabin defined in claim 1 wherein said suction passages are of different widths and/or lengths.

6. The powder-spray cabin defined in claim 1 wherein said inlet and outlet openings are on opposite ones of said peripheral walls and are horizontally offset from one another.

7. The powder-spray cabin defined in claim 1 wherein said outlet opening is located above a level equal to half the height of said enclosure.

8. The powder-spray cabin defined in claim 7 wherein said shield member forms a suction shaft extending from said outlet opening below said level and having a lower suction passage opening beneath said level.

9. The powder-spray cabin defined in claim 8 wherein said suction shaft opens close to said bottom wall and is formed with a widening suction shoe defining a narrow suction slit with said bottom wall.

10. The powder-spray cabin defined in claim 8 wherein said suction passages are suction openings distributed along said suction shaft.

11. The powder-spray cabin defined in claim 10 wherein said suction openings are wedge-shaped bent-out wall portions of the suction shaft.

12. The powder-spray cabin defined in claim 11 wherein said suction openings are formed on portions of said suction shaft connected to said peripheral wall formed with said outlet opening.

* * * * *